United States Patent
Bae et al.

(10) Patent No.: US 11,400,933 B2
(45) Date of Patent: Aug. 2, 2022

(54) VEHICLE HAVING VEHICLE CONTROL DEVICE AND VEHICLE CONTROL METHOD

(71) Applicant: LG ELECTRONICS INC., Seoul (KR)

(72) Inventors: Jaeseung Bae, Seoul (KR); Hansung Kim, Seoul (KR); Suho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 256 days.

(21) Appl. No.: 16/494,494

(22) PCT Filed: Nov. 14, 2017

(86) PCT No.: PCT/KR2017/012858
§ 371 (c)(1),
(2) Date: Sep. 18, 2019

(87) PCT Pub. No.: WO2018/169162
PCT Pub. Date: Sep. 20, 2018

(65) Prior Publication Data
US 2020/0017108 A1    Jan. 16, 2020

(30) Foreign Application Priority Data

Mar. 16, 2017 (KR) .......................... 10-2017-0033336

(51) Int. Cl.
*B60W 30/18* (2012.01)
*H04W 4/46* (2018.01)
(Continued)

(52) U.S. Cl.
CPC . *B60W 30/18009* (2013.01); *G08G 1/096708* (2013.01); *G08G 1/096791* (2013.01);
(Continued)

(58) Field of Classification Search
CPC ....... B60W 30/18009; B60W 2556/65; B60W 2554/80; H04W 4/49; G08G 1/096708; G08G 1/096791
See application file for complete search history.

(56) References Cited

U.S. PATENT DOCUMENTS

| 2013/0120159 A1* | 5/2013 | Stahlin ..................... G08G 1/00 340/902 |
| 2014/0094992 A1* | 4/2014 | Lambert ................ G07C 5/008 701/1 |

(Continued)

FOREIGN PATENT DOCUMENTS

| KR | 20120134631 | 12/2012 |
| KR | 20150015888 | 2/2015 |

(Continued)

OTHER PUBLICATIONS

Aring, "North American 5.9 GHz DSRC Operational Concept/Band Plan," IEEE 802.11-03/0750r0, dated Jul. 24, 2012, 31 pages, XP017691949.

(Continued)

*Primary Examiner* — Peter D Nolan
*Assistant Examiner* — Wae L Louie
(74) *Attorney, Agent, or Firm* — Fish & Richardson P.C.

(57) ABSTRACT

The present disclosure relates to a vehicle having a communication device configured to communicate with an external server through a plurality of channels, and a vehicle control device configured to control the communication device to receive a safety-related message from the external server. The plurality of channels includes a first channel that is allocated to transmit and receive the safety-related message, and the vehicle control device is configured to control the communication device to receive the safety-related mes- (Continued)

sage from the external server through a second channel that is different from the first channel.

18 Claims, 13 Drawing Sheets

(51) Int. Cl.
  *H04W 4/44* (2018.01)
  *G08G 1/0967* (2006.01)
(52) U.S. Cl.
  CPC .............. *H04W 4/44* (2018.02); *H04W 4/46* (2018.02); *B60W 2554/80* (2020.02); *B60W 2556/65* (2020.02)

(56) References Cited

U.S. PATENT DOCUMENTS

| | | | | |
|---|---|---|---|---|
| 2018/0322782 | A1* | 11/2018 | Engel | H04W 4/46 |
| 2019/0053010 | A1* | 2/2019 | Edge | H04W 4/029 |
| 2019/0053154 | A1* | 2/2019 | Song | G08G 1/164 |
| 2020/0229189 | A1* | 7/2020 | Kwak | H04W 76/14 |
| 2020/0288286 | A1* | 9/2020 | Hwang | H04L 5/0092 |
| 2021/0092018 | A1* | 3/2021 | Fang | G07C 5/008 |
| 2021/0136863 | A1* | 5/2021 | Park | H04W 76/27 |

FOREIGN PATENT DOCUMENTS

| | | |
|---|---|---|
| KR | 20150053687 | 5/2015 |
| KR | 101547768 | 8/2015 |
| KR | 101603436 | 3/2016 |

OTHER PUBLICATIONS

Extended European Search Report in European Application No. 17900777.8, dated Jul. 29, 2020, 15 pages.

Gallagher et al, "Wireless Communications for Vehicle Safety: Radio Link Performance & Wireless Connectivity Methods," IEEE Vehicular Technology Magazine, dated Dec. 1, 2006, 14 pages, XP011176537.

Rizzo et al., "Content and Context Aware Strategies for QoS Support in VANETs," 2016 IEEE 30th International Conference on Advanced Information Networking and Applications, dated Mar. 23, 2016, 7 pages, XP032903595.

* cited by examiner

VEHICLE HAVING VEHICLE CONTROL DEVICE AND VEHICLE CONTROL METHOD

CROSS-REFERENCE TO RELATED APPLICATIONS

This application is a National Stage application under 35 U.S.C. § 371 of International Application No. PCT/KR2017/012858, filed on Nov. 14, 2017, which claims the benefit of Korean Application No. 10-2017-0033336, filed on Mar. 16, 2017. The disclosures of the prior applications are incorporated by reference in their entirety.

TECHNICAL FIELD

The present disclosure relates to a vehicle having a vehicle control device and a control method thereof, and more particularly, to a vehicle capable of performing communication.

BACKGROUND

A vehicle is a device capable of being moved in a desired direction by a user who is on board. An automobile is a typical example of such a vehicle.

For convenience of a user using a vehicle, various types of sensors and electronic devices may be provided in the vehicle. In particular, for the convenience of the user's driving, research on an advanced driver assistance system (ADAS) is being actively carried out. Furthermore, development of an autonomous vehicle is also being actively carried out.

Recently, along with the development of an advanced driving assistance system (ADAS), vehicle-to-everything (V2X) communication has been actively developed. As an example of the V2X communication, vehicle-to-vehicle (V2V) safety application (EEBL, FCW, IMA, etc.) services have been actively developed based on dedicated short range communication (DSRC).

Here, EEBL indicates Emergency Electronic Brake Lights, FCW indicates Forward Collision Warning, and IMA indicates Intersection Movement Assistance. The applications correspond to an ADAS function for improving the safety of a vehicle driver by means of V2X communication.

In some cases, a communication device (e.g., radio) designed to receive a service through one channel is provided in a vehicle. For example, the communication device provided in the vehicle may be an on-board unit (OBU) or may be installed in an OBU.

In some cases, there may be a plurality of channels for providing services. However, a vehicle may not be able to activate the plurality of channels at the same time. That is, the communication device may be able to transmit and receive only one service through any one channel at any one time point. Thus, it may not be feasible for a driver to simultaneously receive a plurality of services by means of a single communication device.

SUMMARY

One exemplary object of the present disclosure is to provide a vehicle capable of performing vehicle-to-everything (V2X) communication in an optimized manner.

Another exemplary object of the present disclosure is to provide a vehicle capable of transmitting and receiving a plurality of services using a single communication device.

Still another exemplary object of the present disclosure IS to provide a vehicle capable of simultaneously supporting a V2V safety service and a V2X service through a single communication device.

According to one aspect of the subject matter described in this application, a vehicle includes a communication device configured to communicate with an external server through a plurality of channels, and a vehicle control device configured to control the communication device to receive a safety-related message from the external server. The plurality of channels includes a first channel that is allocated to transmit and receive the safety-related message, and the vehicle control device is configured to control the communication device to receive the safety-related message from the external server through a second channel that is different from the first channel.

Implementations according to this aspect may include one or more of the following features. For example, the second channel may be allocated to transmit and receive a service message, and the vehicle control device may be configured to receive the safety-related message from the external server through the second channel rather than the first channel based on a predetermined condition being satisfied while the communication device is set to the second channel. In some cases, the vehicle control device may be configured to control the communication device to transmit a request message for requesting the safety-related message from the external server through the second channel based on the predetermined condition being satisfied while the communication device is set to the second channel.

In some implementations, the external server may receive at least one safety-related message from one more vehicles present in a predetermined region, and the vehicle control device may be configured to receive a safety-related message corresponding to the request message among safety-related messages received from the external server through the second channel. The request message may include information for requesting a first message related to safety of one or more vehicles in which a predetermined event has occurred, and based on the one or more vehicles in which the predetermined event has occurred being present in the predetermined region, the vehicle control device may receive the first message from the external server through the second channel. In some cases, based on the request message including information for requesting a second message related to safety of a third-party vehicle present within a certain distance from the vehicle, the vehicle control device may receive the second message from the external server through the second channel.

In some implementations, the communication device may be configured to communicate with the external server via a road side unit (RSU) installed on a road. The external server may receive a safety-related message from one or more vehicles present in a predetermined region via the RSU, and the vehicle control device may be configured to receive a safety-related message from the external server via the RSU. In some cases, based on a third-party vehicle that performs communication through a plurality of channels at one time point being identified, the vehicle control device may control the communication device to receive the safety-related message from the third-party vehicle. In some cases, the communication device may also be a radio receiver.

In some implementations, the first channel may be allocated to a first radio frequency, and the second channel may be allocated to a second radio frequency that is different from the first radio frequency. The predetermined condition may include a user request. In some cases, the predetermined condition may include a number of the safety-related messages transmitted to or received from the external server being higher than a reference value. The predetermined event may include being in an accident, breaking down, or being an emergency vehicle. In some cases, safety-related message may be formed according to a dedicated short-range communication (DSRC) communication standard. The vehicle control device may be configured, based on receiving the safety-related message from the third-party vehicle, to determine at least one of a relative location, a relative speed, or a relative angle of the third-party vehicle. The vehicle control device may be configured, based on receiving the safety-related message from the third-party vehicle, to perform an advanced driving assistance system (ADAS) function.

According to another aspect, a vehicle control method includes communicating with an external server through any one of a plurality of channels, and receiving a safety-related message from the external server. The receiving includes receiving the safety-related message from the external server through a channel other than a channel allocated to transmit and receive the safety-related message.

Implementations according to this aspect may include one or more of the following features. For example, the vehicle control method may further include receiving at the external server at least one safety-related message from a third-party vehicle present in a predetermined region. In some cases, the method may further include determining, based on receiving the safety-related message from the third-party vehicle, at least one of a relative location, a relative speed, or a relative angle of the third-party vehicle.

According to an implementation of the present disclosure, it may be possible to achieve one or more of the following effects.

For example, the present disclosure can provide a vehicle capable of receiving a plurality of services. Also, the present disclosure can provide a vehicle capable of receiving a safety-related message at any time a user wants by receiving the safety-related message through a channel other than a channel allocated to receive the safety-related message.

The effects of the present disclosure is not limited to the above-mentioned effects, and other effects not mentioned herein may be clearly understood by those skilled in the art from the description of the claims.

DETAILED DESCRIPTION

Figure 1:
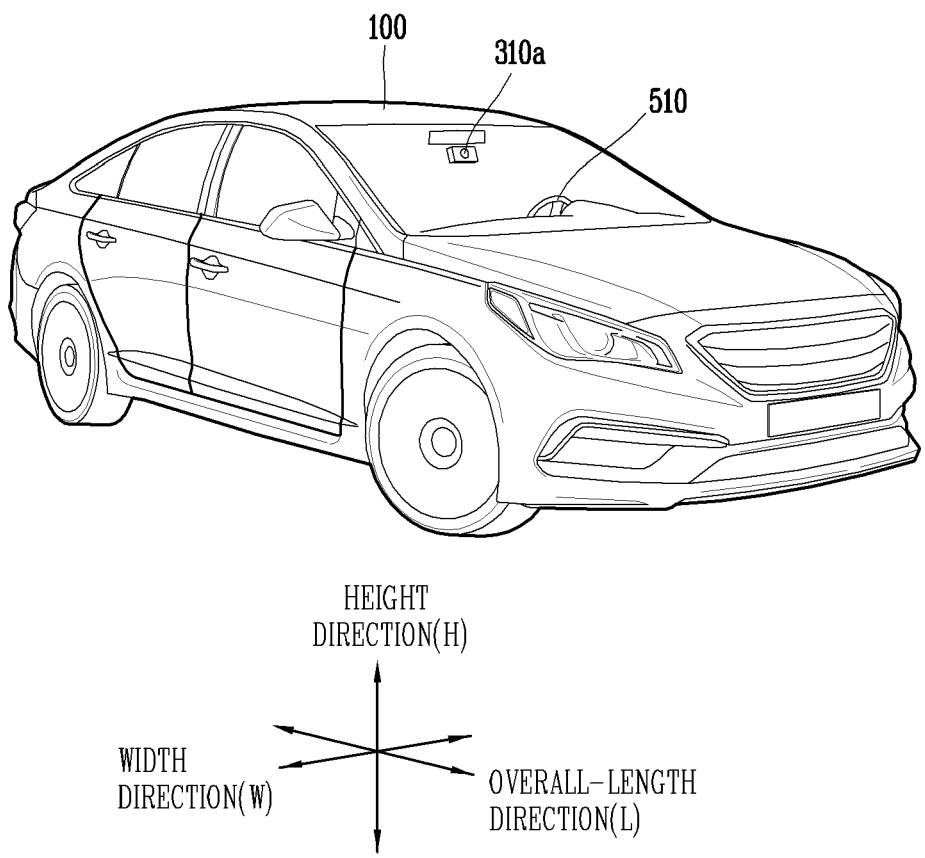
FIG. 1 is a view illustrating an example appearance of a vehicle according to an implementation of the present disclosure.
Figure 2:
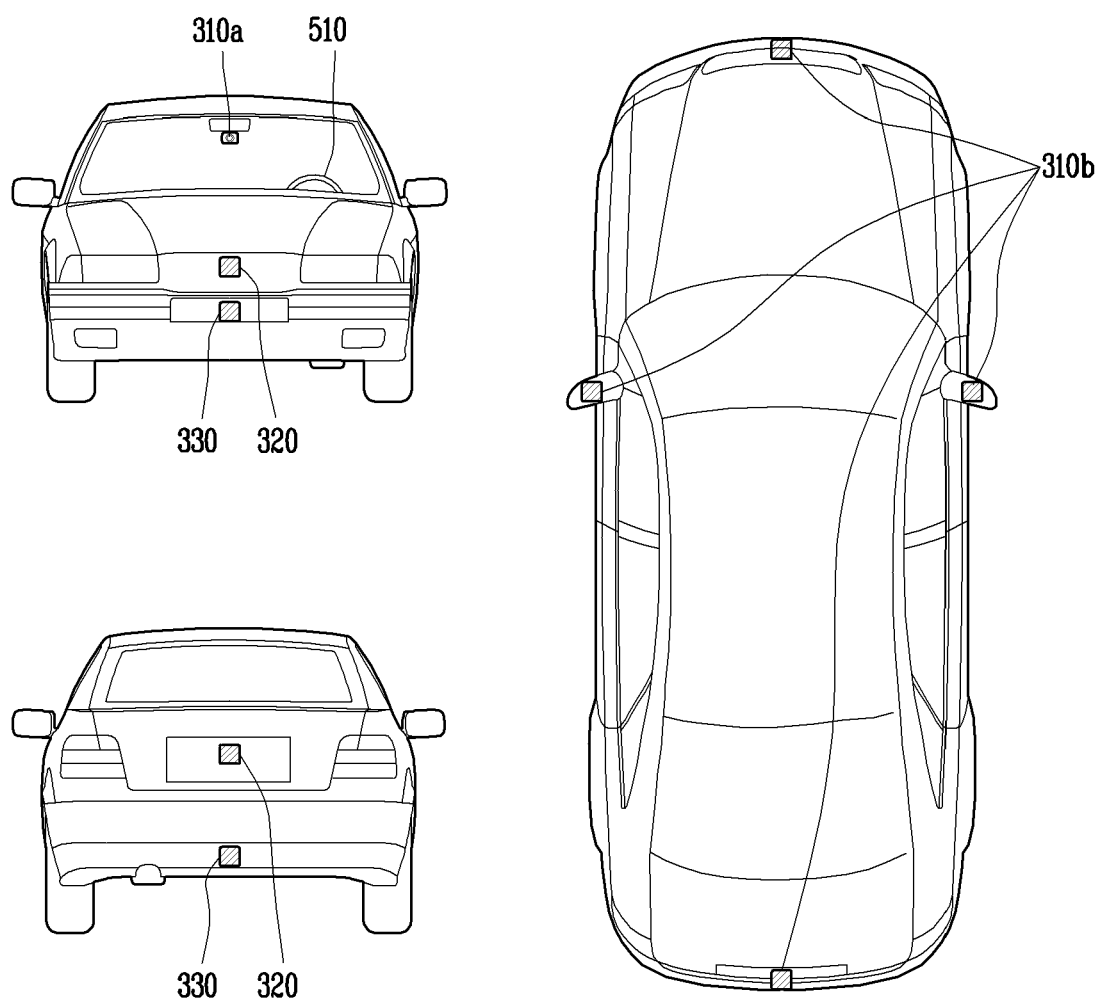
FIG. 2 illustrates an example vehicle according to an implementation of the present disclosure viewed at various angles from the outside.
Figure 3:
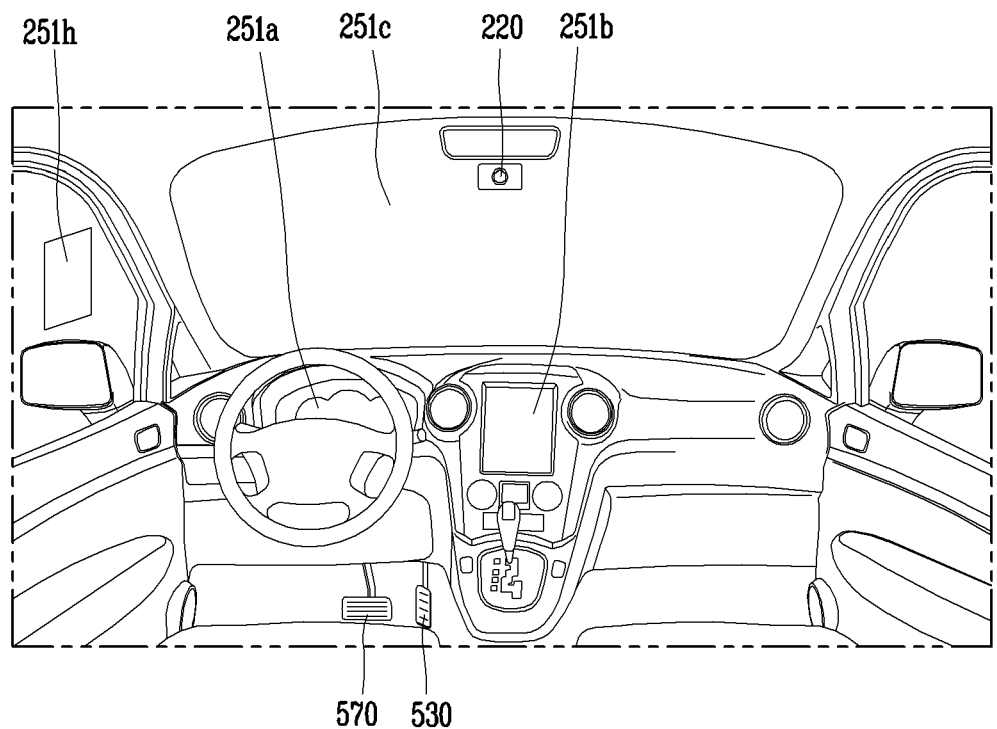
FIGS. 3 and 4 are views illustrating an example interior of a vehicle according to an implementation of the present disclosure.
Figure 4:
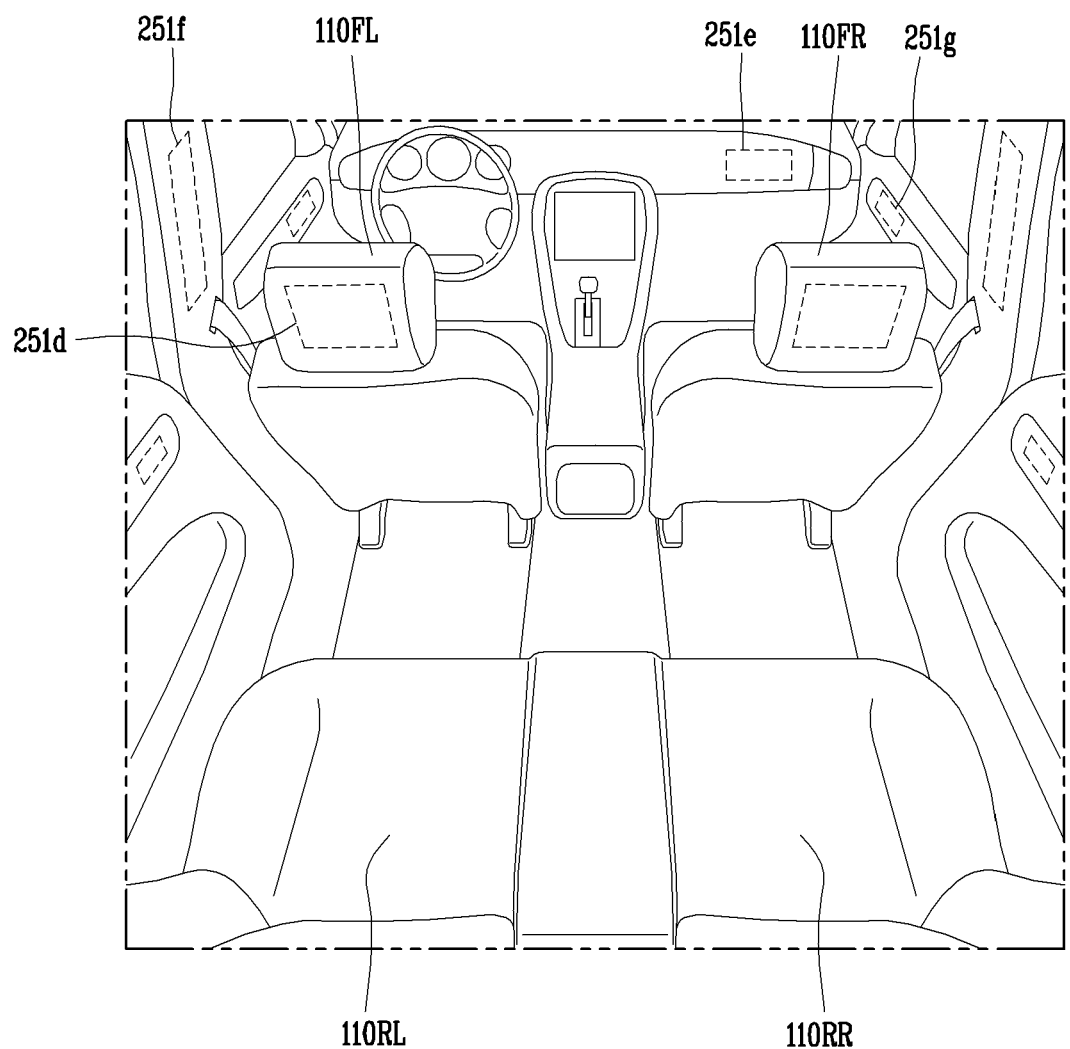

Hereinafter, the implementations disclosed herein will be described in detail with reference to the accompanying drawings.

A vehicle according to an implementation of the present disclosure may include cars, motorcycles, and the like, including an internal combustion engine car having an engine as a power source, a hybrid vehicle having an engine and an electric motor as power sources, an electric vehicle having an electric motor as a power source, and the like.

In the following description, a left side of a vehicle generally refers to a left side in a driving direction of the vehicle, and a right side of the vehicle refers to a right side in the driving direction.

Referring to FIGS. 1 through 7, a vehicle 100 may include wheels that are turned by a driving force, and a steering apparatus 510 for adjusting a driving (ongoing, moving) direction of the vehicle 100.

The vehicle 100 may be an autonomous vehicle. In some cases, the vehicle 100 may be switched into an autonomous mode or a manual mode based on a user input. For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700. For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length as used herein refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

Figure 7:
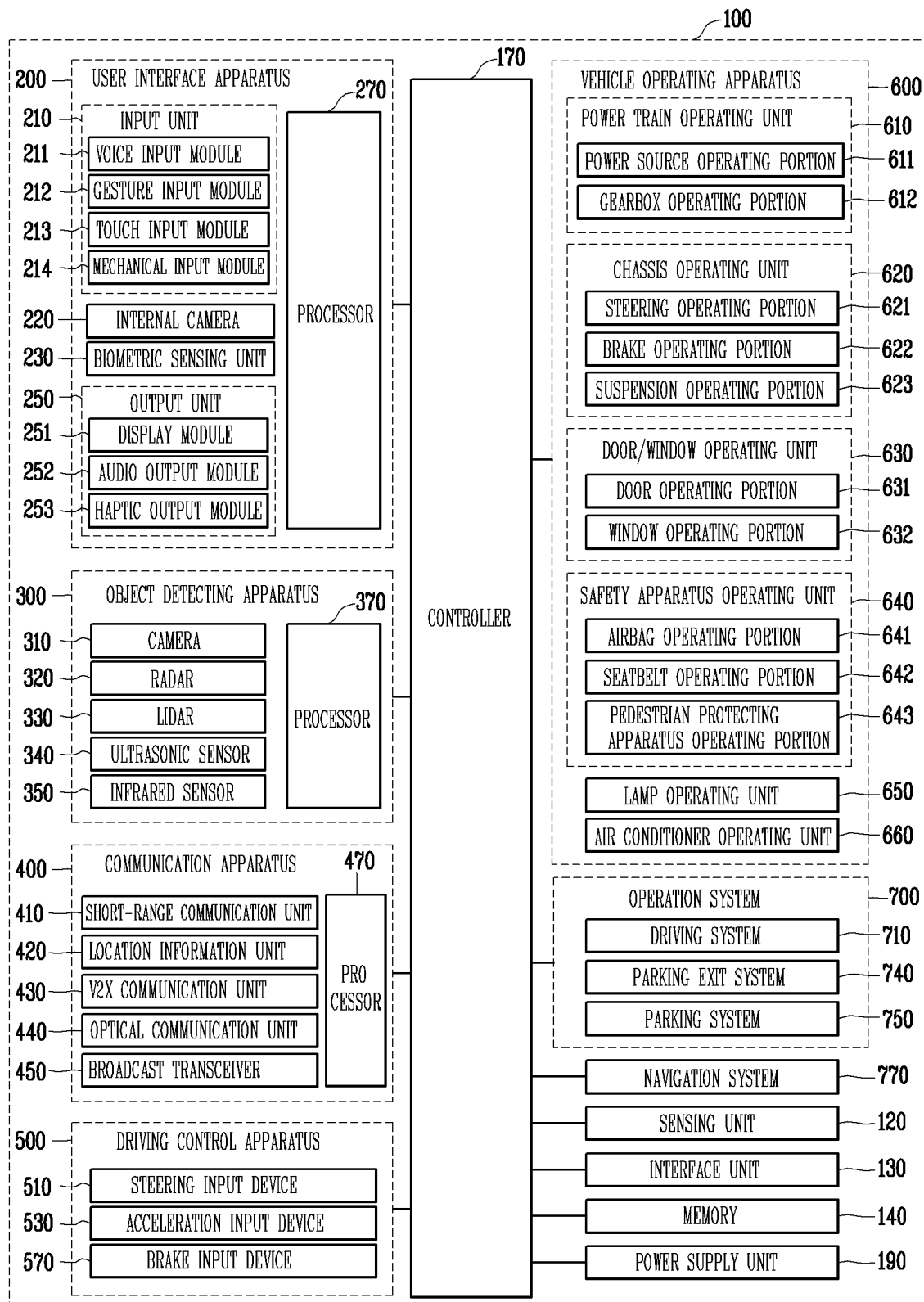
FIG. 7 is a block diagram illustrating example components of a vehicle according to an implementation of the present disclosure.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to some implementations, the user interface apparatus 200 may include more components in addition to components to be explained in this specification or may not include some of those components to be explained in this specification.

The input unit 210 may allow the user to input information. Data collected in the input unit 120 may be analyzed by the processor 270 and processed as a user's control command.

The input unit 210 may be disposed within the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214. The audio input module 211 may convert a user's voice input into an electric signal. The converted electric signal may be provided to the processor 270 or the controller 170. The voice input module 211 may include at least one microphone. The gesture input module 212 may convert a user's gesture input into an electric signal. The converted electric signal may be provided to the processor 270 or the controller 170. The gesture input module 212 may include at least one of an infrared sensor and an image sensor for detecting the user's gesture input.

According to some implementations, the gesture input module 212 may detect a user's three-dimensional (3D) gesture input. To this end, the gesture input module 212 may include a light emitting diode outputting a plurality of infrared rays or a plurality of image sensors.

In some cases, the gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170. The touch input module 213 may include a touch sensor for detecting the user's touch input.

According to one implementation, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal. The output unit 250 may include at least one of a display module 251, an audio output module 252 and a haptic output module 253.

The display module 251 may output graphic objects corresponding to various types of information. The display module 251 may include at least one of a liquid crystal display (LCD), a thin film transistor-LCD (TFT LCD), an organic light-emitting diode (OLED), a flexible display, a three-dimensional (3D) display, or an e-ink display, among others.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display unit 251 may include a transparent display. The transparent display may be attached to the windshield or the window.

The transparent display may have a predetermined degree of transparency and output a predetermined screen thereon. The transparent display may include at least one of a transparent TFEL (Thin Film Electroluminescent), a transparent OLED (Organic Light-Emitting Diode), a transparent LCD (Liquid Crystal Display), a transmissive transparent display, and a transparent LED (Light Emitting Diode) display. The transparent display may have adjustable transparency.

In some implementations, the user interface apparatus 200 may include a plurality of display modules 251*a* to 251*g*.

The display module 251 may be disposed on one area of a steering wheel, one area 521*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an implementation, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In some implementations, the user interface apparatus 200 may be referred to as a display apparatus for vehicle. The user interface apparatus 200 may operate according to the control of the controller 170.

The object detecting apparatus 300 is an apparatus for detecting an object located at outside of the vehicle 100. The object may be a variety of objects associated with driving (operation) of the vehicle 100.

Figure 5:
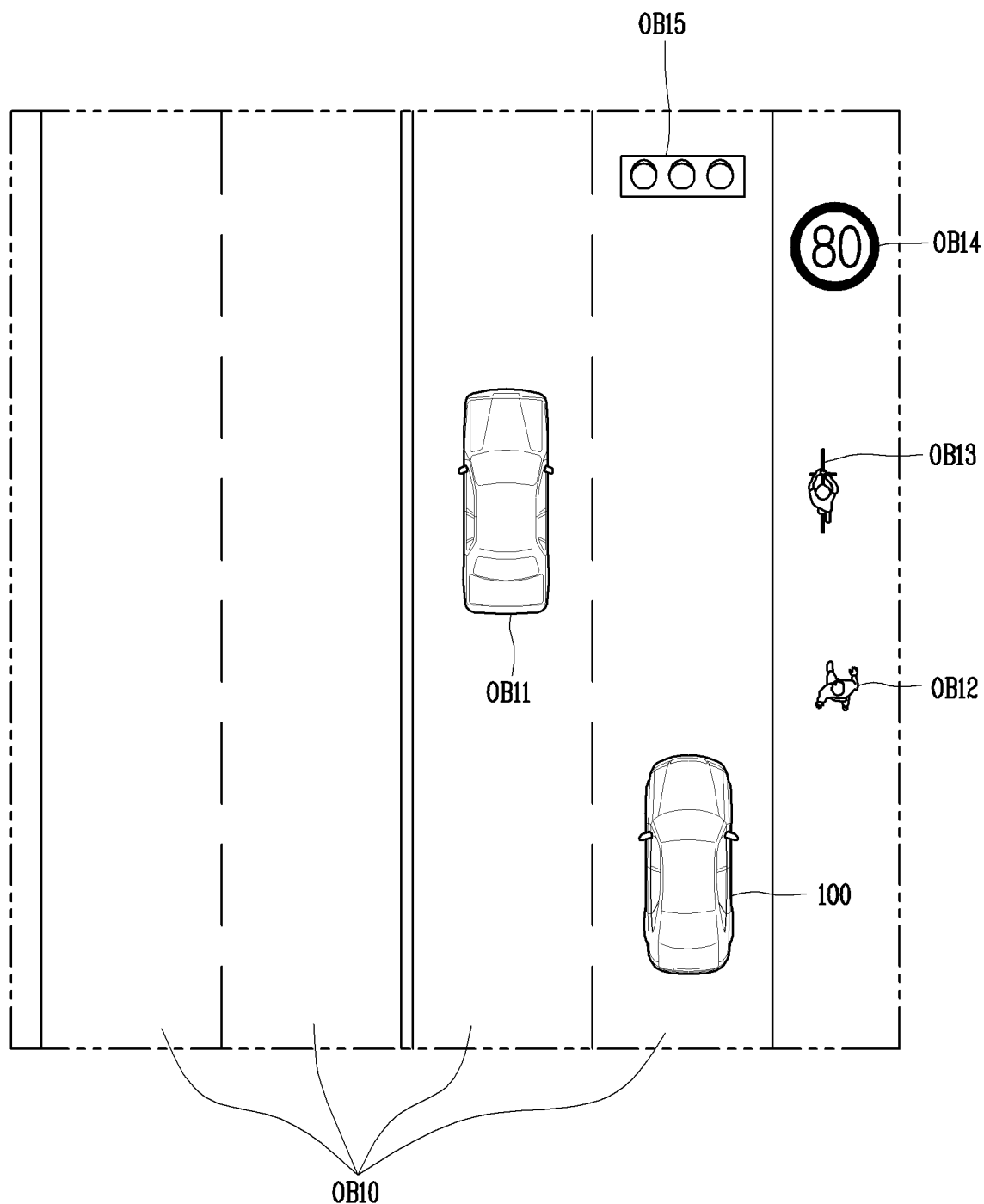
FIGS. 5 and 6 are exemplary views illustrating outside objects according to an implementation of the present disclosure.
Figure 6:
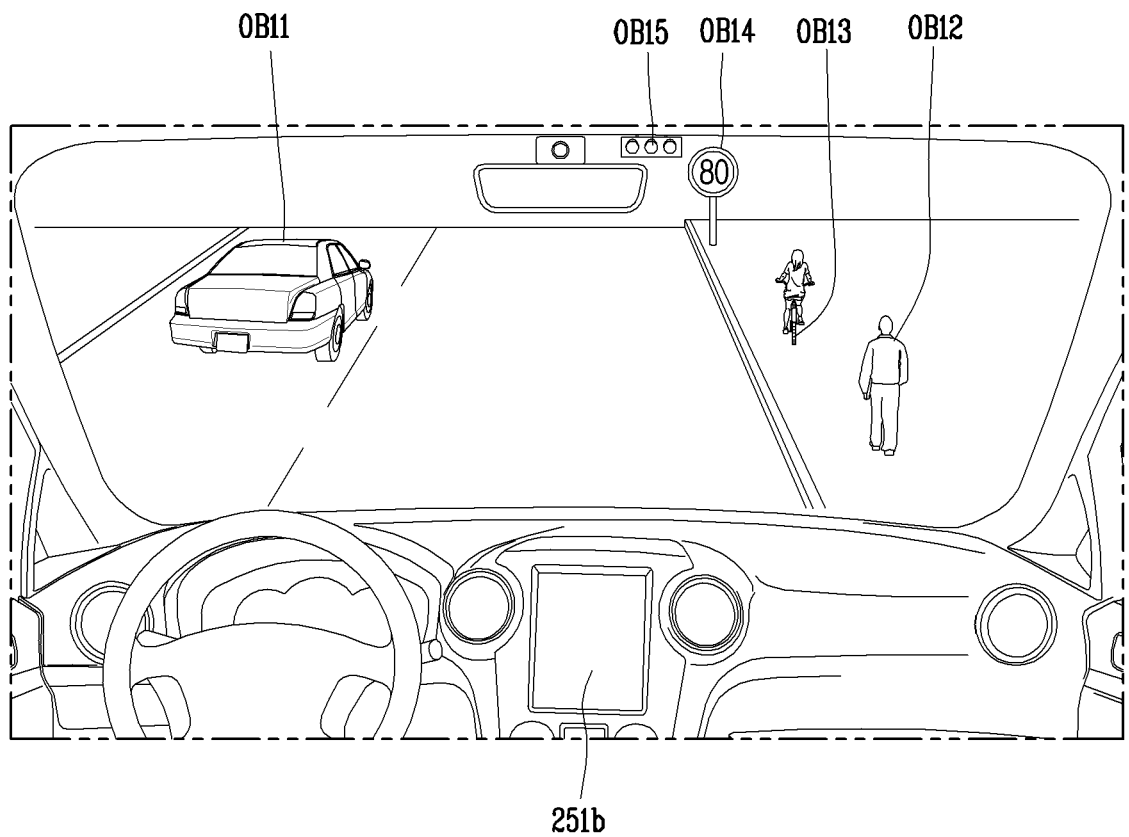

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a lidar 330, an ultrasonic sensor 340, an infrared sensor 350 and a processor 370.

According to an implementation, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an AVM (Around View Monitoring) camera 310b, or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented by a Frequency Modulated Continuous Wave (FMCW) scheme or a Frequency Shift Keying (FSK) scheme according to a signal waveform in a continuous wave radar scheme.

The radar 320 may detect an object in a time of flight (TOF) manner or a phase-shift manner through the medium of electromagnetic waves, and detect a position of the detected object, a distance from the detected object and a relative speed with the detected object.

The radar 320 may be disposed on an appropriate position outside the vehicle for detecting an object which is located at a front, rear or side of the vehicle.

The lidar 330 may include laser transmitting and receiving portions. The lidar 330 may be implemented in a time of flight (TOF) manner or a phase-shift manner.

The lidar 330 may be implemented as a drive type or a non-drive type.

For the drive type, the lidar 330 may be rotated by a motor and detect object near the vehicle 100.

For the non-drive type, the lidar 330 may detect, through light steering, objects which are located within a predetermined range based on the vehicle 100. The vehicle 100 may include a plurality of non-drive type lidars 330.

The lidar 330 may detect an object in a time of flight (TOF) manner or a phase-shift manner through the medium of laser light, and detect a position of the detected object, a distance from the detected object and a relative speed with the detected object.

The lidar 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an implementation, the object detecting apparatus 300 may include a plurality of processors 370 or may not include any processor 370. For example, each of the camera 310, the radar 320, the lidar 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (vehicle to infrastructure; V2I), another vehicle (vehicle to vehicle; V2V), or a pedestrian (vehicle to pedestrian; V2P). The V2X communication unit 430 may include an RF circuit capable of implementing a communication protocol with an infrastructure (V2I), a communication protocol between vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In some implementations, the communication apparatus 400 may implement a display apparatus for a vehicle together with the user interface apparatus 200. In such instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some implementations, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

In some implementations, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some cases, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some cases, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating portion 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may be operated in the autonomous driving mode.

The operation system 700 may include a driving system 710, a parking exit system 740 and a parking system 750.

According to implementations, the operation system 700 may further include other components in addition to components to be described, or may not include some of the components to be described.

In some implementations, the operation system 700 may include a processor. Each unit of the operation system 700 may individually include a processor.

In some implementations, the operation system may be a sub concept of the controller 170 when it is implemented in a software configuration.

In some implementations, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to implementations, the navigation system 770 may update pre-stored information by receiving information from an external device through the communication apparatus 400.

According to implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be various storage apparatuses such as a ROM, a RAM, an EPROM, a flash drive, a hard drive, and the like in terms of hardware. The memory 140 may store various data for overall operations of the vehicle 100, such as programs for processing or controlling the controller 170.

According to implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In some implementations, the control unit 170 may be a vehicle control device. The vehicle control device 170 may be a separate element independent of the control unit 170. When the vehicle control device 170 is implemented as an element independent of the control unit 170, the vehicle control device 170 may be provided in a part of the vehicle 100. The vehicle control device 170 may control at least one of the elements described with reference to FIG. 7.

For convenience of description, it is assumed that the vehicle control device 170 is a separate element independent of the control unit 170. In this specification, the functions (operations) of and a control method for the vehicle control device may be performed by the control unit 170 of the vehicle. That is, the following description associated with the vehicle control device 800 (or a processor included in the vehicle control device) may also be applied to the control unit 170 in the same or similar manner.

The communication device 400 included in the vehicle 100 associated with the present disclosure may perform vehicle-to-everything (V2X) communication.

V2X communication may include vehicle-to-vehicle (V2V) communication, vehicle-to-infrastructure (V2I) communication, and vehicle-to-pedestrian (V2P) communication.

The communication device 400 may communicate with any communicative device (e.g., a mobile terminal, a server, a vehicle, an infrastructure, etc.). This may be referred to as V2X communication.

The communication device 400 may communicate with a nearby vehicle (or a third-party vehicle). This may be called V2V communication. V2V communication may be generally defined as a technology for exchanging information between vehicles and allows nearby vehicle locations, speed information, and the like to be shared.

V2I communication may be generally defined as a technology of exchanging or sharing information such as traffic conditions while communicating with an infrastructure (e.g., a road side unit (RSU)) installed on a road during driving.

V2P communication may be generally defined as a technology for exchanging or sharing information such as vehicle information, vehicle periphery information, and vehicle driving information while communicating between a vehicle and a mobile terminal carried by a user (e.g., a pedestrian).

The communication device may be called an on-board unit (OBU). An OBU is provided in the vehicle to perform V2X communication. The communication device 400 described herein may be an OBU itself or may be provided (installed) in an OBU.

The communication device 400 may include a single radio chip. The communication device 400 may perform only one communication at any one time point through the single radio chip.

For example, the communication device 400 may perform V2V communication or V2I communication through the single radio chip. That is, since the single radio chip can perform only one communication at any one time point, the V2V communication and the V2I communication cannot be performed at the same time.

This communication may be made through a channel having a predetermined frequency band. That is, only one communication (or service) being performed at any one time point means that the communication is made at a time through only one channel.

Figure 8:
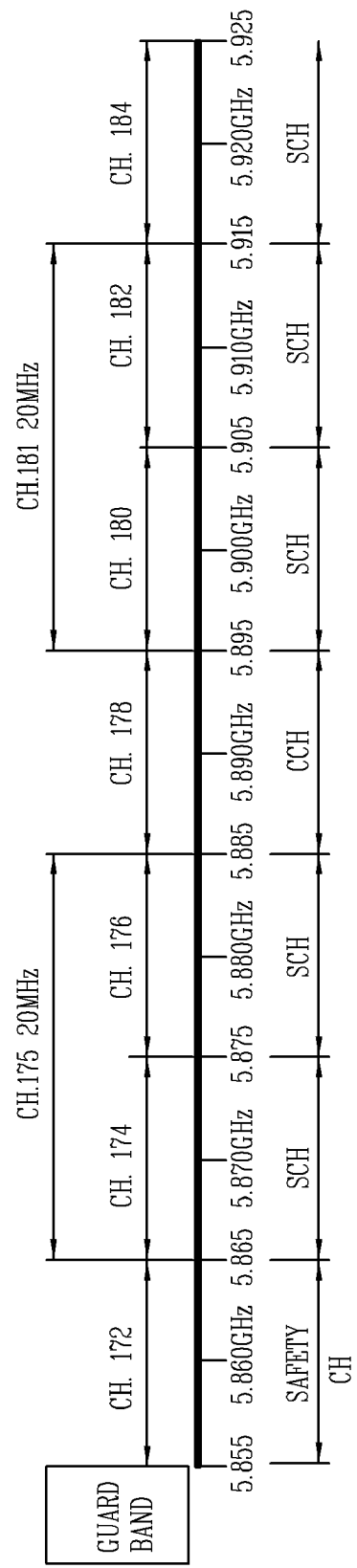
FIG. 8 is a conceptual diagram illustrating an example communication channel according to an implementation of the present disclosure.

FIG. 8 is a conceptual diagram illustrating a communication channel according to an implementation of the present disclosure.

A plurality of channels may be allocated to a frequency used for vehicle communication. Each channel may have, for example, a frequency band (or bandwidth) of 10 MHz to 20 MHz.

In FIG. 8, for example, information regarding channel-specific frequency allocation in the United States is shown.

For example, frequencies ranging from 5.855 GHz to 5.865 GHz may be designated as channel #172 (Ch. 172) and allocated as a channel for transmitting and receiving a safety-related message. Here, the safety-related message may include a message formed according to the dedicated short-range communication (DSRC) communication standard, such as basic safety message (BSM) data or local dynamic map (LDM) data used for V2V communication or V2X communication, the message being used to transmit and receive information regarding autonomous vehicle driving or vehicle driving.

When the safety-related message is received, the control unit 170 of the host vehicle 100 may determine a relative location, a relative speed, and a relative angle, and the like of a third-party vehicle on the basis of the safety-associated message. Subsequently, the control unit 170 may perform an ADAS function such as EEBL, FCW, IMA, and autonomous emergency brake (AEB) or may enable the host vehicle 100 to be autonomously driven.

The channel for transmitting and receiving the safety-related message may be called a safety channel or a public safety channel.

The vehicle control device 170 of the host vehicle 100 may broadcast a message related to the safety of the host vehicle to an external server or other vehicles through the safety channel at predetermined intervals (or at intervals specified in the standard)(e.g., 10 Hz).

As another example, frequencies ranging from 5.895 GHz to 5.905 GHz may be designated as channel #180 (Ch. 180) and allocated as a channel for transmitting and receiving a service message. Here, the service message may include an advertisement message, a radio broadcast message, etc. In this case, the channel for transmitting and receiving the service message may be called a service channel (SCH).

As still another example, frequencies ranging from 5.885 GHz to 5.895 GHz may be designated as channel #178 (Ch. 178) and allocated as a channel for transmitting and receiving a control message. Here, the control message may contain information indicating which channel is the service channel and which channel is the safety channel. The channel for transmitting and receiving the control message may be called a control channel (CCH).

Here, a service being provided may mean that a message is received through a channel.

The aforementioned specific frequency bands are numerical values that are arbitrarily specified to describe the safety channel, the service channel, and the control channel, but are not limited to the numerical values.

The frequencies for the channels may vary by continent, country, and city. For example, in Europe, the safety channel may be specified as channel #180 and have a frequency of 5.895 GHz to 5.905 GHz.

According to the present disclosure, a plurality of channels may be used for vehicle communication and may include the safety channel, the service channel, and the control channel. The safety channel, the service channel, and the control channel may be allocated as different frequency bands by continent, country, and city, but are not limited to the above-described numerical values. Also, the safety channel, the service channel, and the control channel may be specified as different channel numbers by continent, country, and city.

In some cases, the plurality of channels used for the vehicle communication may be variously specified (allocated) or varied according to user settings.

The communication device 400 provided in the vehicle of the present disclosure may perform communication through one channel at any one point. For example, when the communication device 400 performs communication through any one service channel, the communication device 400 cannot perform communication through other service channels, safety channels, or control channels.

In this case, the present disclosure can provide a vehicle capable of receiving a safety-related message while transmitting and receiving a service message (or a control message) through any one service channel (or control channel). That is, the present disclosure can provide a vehicle capable of receiving a safety-related message transmitted or received through the safety channel even when a channel other than the safety channel (e.g., a service channel) is set.

A method of receiving a plurality of services through one channel will be described below in more detail with reference to the accompanying drawings.

FIGS. 9, 10, 11, 12, and 13 are conceptual diagrams illustrating a vehicle communication method associated with the present disclosure.

First, a vehicle 100 of the present disclosure may communicate with an external server through any one channel among a plurality of channels. In detail, a communication device 400 provided in the vehicle 100 may be formed to communicate with through any one channel among a plurality of channels.

In this case, the communication device 400 may perform V2X communication at any one time point through only one channel among a plurality of channels used for V2X communication.

Here, performing communication means that a message being transmitted or received through a corresponding channel is transmitted or received.

The host vehicle 100 may communicate with an external server 900 via a communication network 910b through an infrastructure (a road side unit (RSU)) 910A installed on a road.

Figure 9:
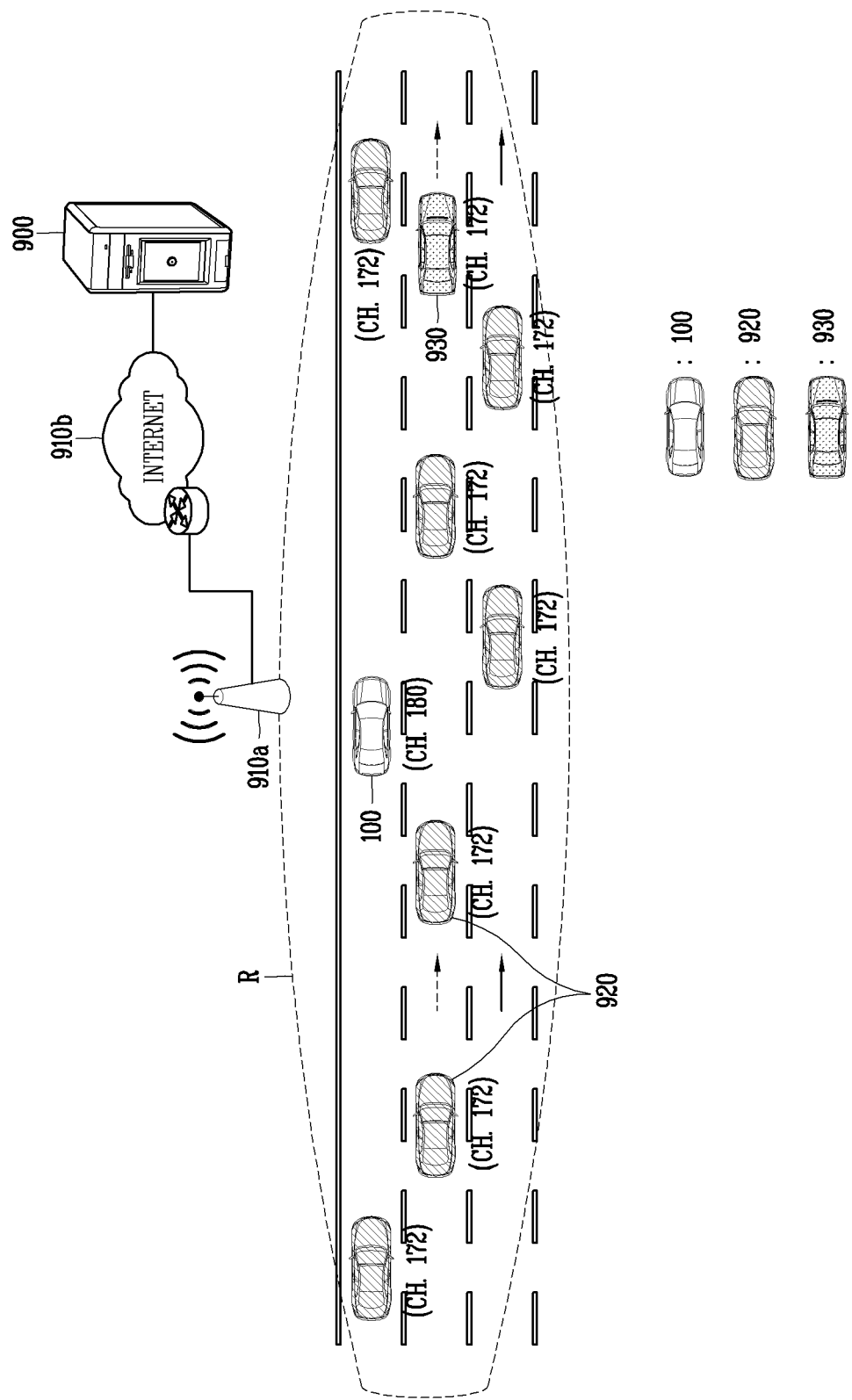
FIGS. 9, 10, 11, 12, and 13 are conceptual diagrams illustrating example vehicle communication methods associated with the present disclosure.

As shown in FIG. 9, the infrastructure (RSU) 910a may be installed on or near a road. The infrastructure (RSU) 910a may communicate with at least one vehicle present in a predetermined region.

Also, the infrastructure (RSU) 910a may communicate with the external server 900 through a communication network 910b.

Here, the host vehicle 100 (or the communication device 400) communicating with the external server 900 may mean that the host vehicle 100 performs communication (or short-range communication) with the infrastructure (RSU) 910a.

As shown in FIG. 9, the external server 900 (the infrastructure (RSU) 910a) may communicate with at least one vehicle 100, 920, or 930 present in a predetermined region R.

Here, the predetermined region R refers to a region where the infrastructure (RSU) 910a can communicate with a vehicle and may be determined by user settings or determined by communication performance of the infrastructure 910a.

The external server 900 may receive a safety-related message (e.g., BSM) through a safety channel (e.g., Ch. 172) from at least one vehicle present in the predetermined region R. The safety-related message may be a beacon message.

That is, the at least one vehicle may transmit the safety-related message to the infrastructure (RSU) 910a at predetermined intervals (or at intervals specified in the DSRC standard) (e.g., 10 Hz.).

The external server 900 may collect safety-related messages received via the infrastructure (RSU) 910a and may transmit a safety-related message processed based on a predetermined algorithm (e.g., an algorithm used for a vehicle safety function (e.g., EEBL, FCW, IMA, etc.) included in the ADAS function) to at least one vehicle present in the predetermined region R.

The present disclosure is not limited thereto, and the external server 900 may transmit a safety-related message received from a vehicle in which a predetermined event has occurred among the received safety-related messages to at least one vehicle present in the predetermined region R.

In this case, the processed safety-related message (or the safety-related message) received from the vehicle in which the predetermined event has occurred may be transmitted to vehicles present in the predetermined region R through the safety channel. Among the vehicles present in the predetermined region R, a vehicle for which the safety channel is set may receive the processed safety-related message through the safety channel.

The service channel (e.g., Ch. 180) rather than the safety channel may be set for the vehicle 100 of the present disclosure. In this case, the vehicle 100 can receive only a message provided through the set service channel and cannot receive the safety-related message transmitted and received through the safety channel.

This is because the communication device 400 has a single radio chip and thus communication can be performed through only one channel at one time point.

However, according to the present disclosure, the host vehicle 100 may receive the safety-related message while the service channel rather than the safety channel is set. This will be described below in detail with reference to the accompanying drawings.

The vehicle 100 of the present disclosure may include the communication device 400 for communicating with the external server 900 through any one of the plurality of channels.

Also, the vehicle 100 of the present disclosure may include the vehicle control device 170 for controlling the communication device 400 to receive a safety-related message (e.g., BSM) from the external server 900.

In this case, the vehicle 100 of the present disclosure may control the communication device 400 to receive the safety-related message from the external server 900 through a channel (e.g., a service channel) other than a channel (e.g., a safety channel) allocated to transmit and receive the safety-related message.

It may be prohibited that messages (or information or data) other than the safety-related message are transmitted or received through the channel allocated to transmit and receive the safety-related message. This can be to prevent congestion on the safety channel.

Meanwhile, various messages (information) other than the service message may be transmitted or received through the channel allocated to transmit and receive the service message.

The plurality of channels formed to allow communication between the communication device 400 of the host vehicle 100 and the external server 900 (or the infrastructure (RSU) 910*a*) may include a first channel (safety channel) for transmitting or receiving a safety-related message and a second channel (service channel) for transmitting or receiving a service message.

The service message may include a control message, and the second channel may include a control channel.

As shown in FIG. 9, the host vehicle 100 may receive the service message from the external server 900 through the service channel rather than the first channel for transmitting or receiving the safety-related message to or from the external server 900 (or the infrastructure (RSU) 910*a*).

For example, any one service channel (the second channel, e.g., Ch. 180) among the plurality of channels may be set for the host vehicle 100 to receive local shopping mall information, local parking lot information, or the like.

At least one vehicle 920 present in a region R predetermined to communicate with the external server (or the infrastructure (RSU) 910*a*) may transmit or receive the safety-related message to or from the external server 900 (or the infrastructure (RSU) 910*a*) through the safety channel (the first channel, e.g., Ch. 172) at predetermined intervals.

Meanwhile, a vehicle 930 in which an event has occurred may be present in the region R predetermined to communicate with the external server 900 (or the infrastructure (RSU) 910*a*). The vehicle 930 in which the event has occurred may be, for example, an accident vehicle, a breakdown vehicle, an emergency vehicle, or the like.

In this case, the host vehicle 100 may not receive the safety-related message from the external server (900) (or the infrastructure (RSU) 910*a*) because the service channel (the second channel) rather than the safety channel (the first channel) is set for the host vehicle 100.

In this case, the vehicle control device 170 of the host vehicle 100 may receive the safety-related message through the second channel for transmitting or receiving the service message rather than the first channel for receiving the safety-related message on the basis of a predetermined condition being satisfied while the second channel is set for the host vehicle 100.

Here, the predetermined condition may include a case in which a vehicle in which a predetermined event has occurred (e.g., an accident vehicle, a breakdown vehicle, an emergency vehicle, or the like) is present in the predetermined region R, a case in which the amount (traffic) of the safety-related message transmitted to or received from an external server (or an infrastructure (RSU)) in the predetermined region R is higher than a reference value, a case in which there is a user request, a case in which an external server is controlled, a case in which a predetermined time is elapsed, or the like.

In addition, the predetermined condition may include various conditions (situations) for transmitting or receiving the safety-related message through the second channel when the second channel rather than the first channel for transmitting or receiving the safety-related message (BSM) is set.

Figure 10:
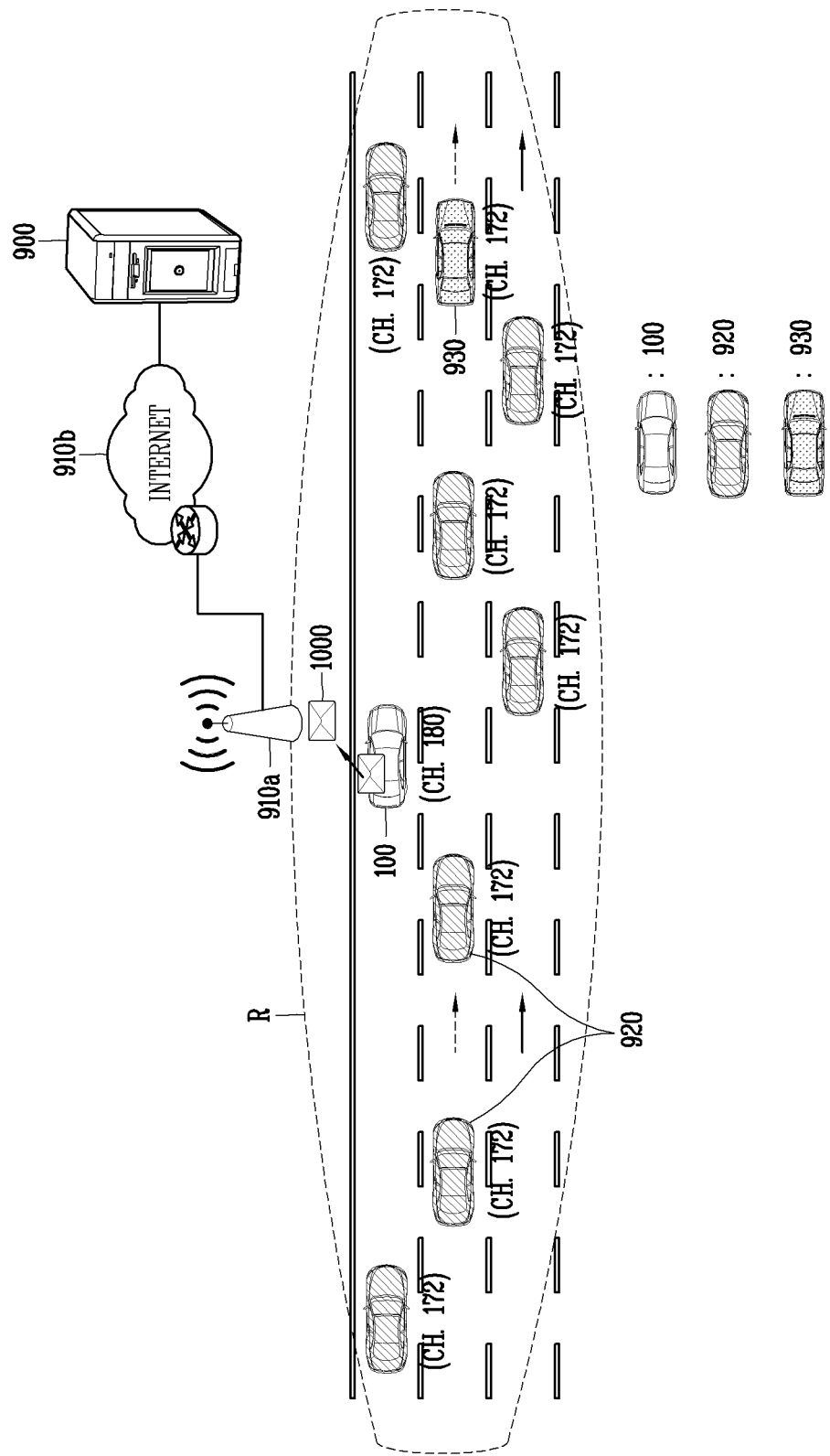

To this end, as shown in FIG. 10, when the predetermined condition is satisfied while the second channel for transmitting or receiving the service message is set, the vehicle control device 170 may control the communication device 400 to transmit a request message 1000 for requesting the safety-related message through the second channel (i.e., the currently set channel) to the external server 900 (or the infrastructure (RSU) 910*a*).

In this case, the vehicle control device 170 may control the communication device 400 to transmit a message related to the safety of the host vehicle to the external server 900 (or the infrastructure (RSU) 910*a*) through the set second channel.

Figure 11:
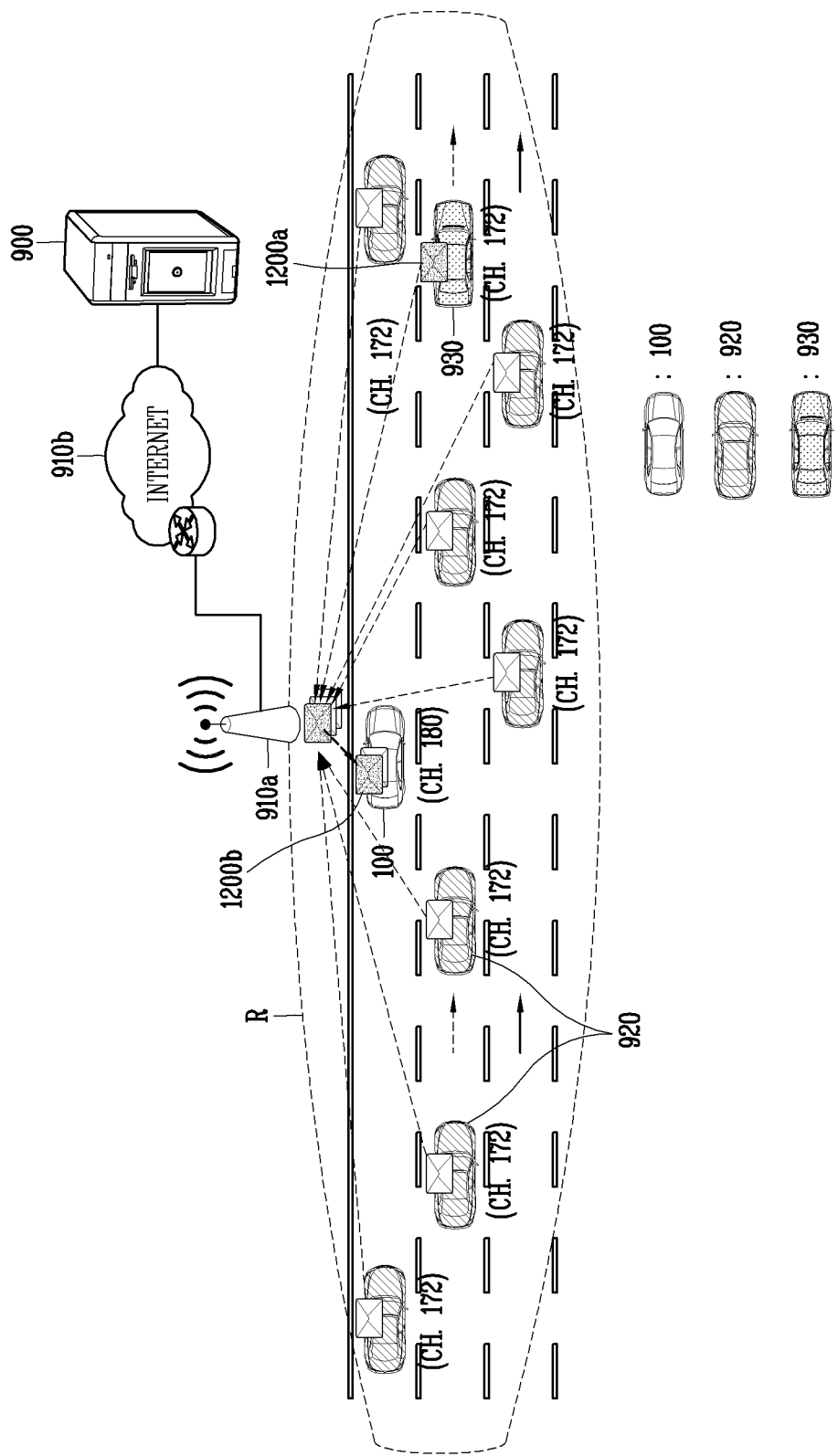

As shown in FIG. 11, the external server 900 may receive at least one safety-related message 1100 or 1200*a* from at least one vehicle present in the predetermined region R.

In this case, the external server 900 may receive the at least one safety-related message 1100 or 1200*a* from the at least one vehicle via the infrastructure (RSU) 910*a* through the first channel (the safety channel, e.g., Ch. 172).

Subsequently, the external server 900 may transmit the safety-related message 1200*b* corresponding to the request message 1000 for requesting the safety-related message received from the host vehicle, which is one of the safety-related messages 1100 and 1200*a*, through the second channel (the service channel, e.g., Ch. 180) set for the host vehicle.

That is, the vehicle control device 170 of the host vehicle 100 may receive the safety-related message 1200*b* corresponding to the request message 1000, which is one of the safety-related messages 1100 and 1200*a* received from the external server 900, through the second channel.

In this case, as shown in FIG. 11, the request message 1000 transmitted from the host vehicle 100 to the external server 900 (or the infrastructure (RSU) 910*a*) may include information for requesting a first message related to the safety of the vehicle 930 in which the predetermined event has occurred (e.g., an accident vehicle, a breakdown vehicle, an emergency vehicle, etc.).

In this case, when the at least one vehicle present in the predetermined region R includes the vehicle in which the predetermined event has occurred, the external server 900 may transmit the safety-related message 1200*a* (the first message) received from the vehicle 930 in which the predetermined event has occurred to the host vehicle 100 through the channel through which the request message has been received.

That is, the external server 900 may transmit a message 1200*b* corresponding to the first message 1200*a* among at least one piece of safety-related information received from the at least vehicle present in the predetermined region R to the host vehicle 100 through the channel through which the request message has been received.

In other words, when the vehicle in which the predetermined event has occurred is present in the predetermined region R, the vehicle control device 170 of the host vehicle 100 may receive the message 1200b corresponding to the first message 1200a from the external server 900 (or the infrastructure (RSU) 910a) through the currently set second channel (or the second channel through which the request message has been transmitted).

The message 1200b may be the first message 1200a itself that is received from the vehicle in which the predetermined event has occurred or the message processed according to the predetermined algorithm.

Through this configuration, the present disclosure can provide a communication method capable of transmitting a request message for requesting a safety-related message from an external server through a service channel and capable of receiving the safety-related message from the external server through the service channel when the service channel rather than a safety channel for transmitting or receiving the safety-related message is set.

This is because the safety channel is regulated to transmit or receive only the safety-related message but the safety-related message may be transmitted or received not only through the safety channel but also through the service channel. That is, various messages such as the safety-related message in addition to the service message may be transmitted or received through the service channel.

Thus, when the service channel (or the control channel) rather than the safety channel is set for the host vehicle 100, the host vehicle 100 may transmit a request message for requesting the safety-related message to the external server through the service channel and may receive the safety-related message from the external server through the set service channel.

Thus, the present disclosure can provide a communication method capable of receiving even the safety-related message without changing channels while receiving the service message (or service) provided through the service channel.

Figure 12:
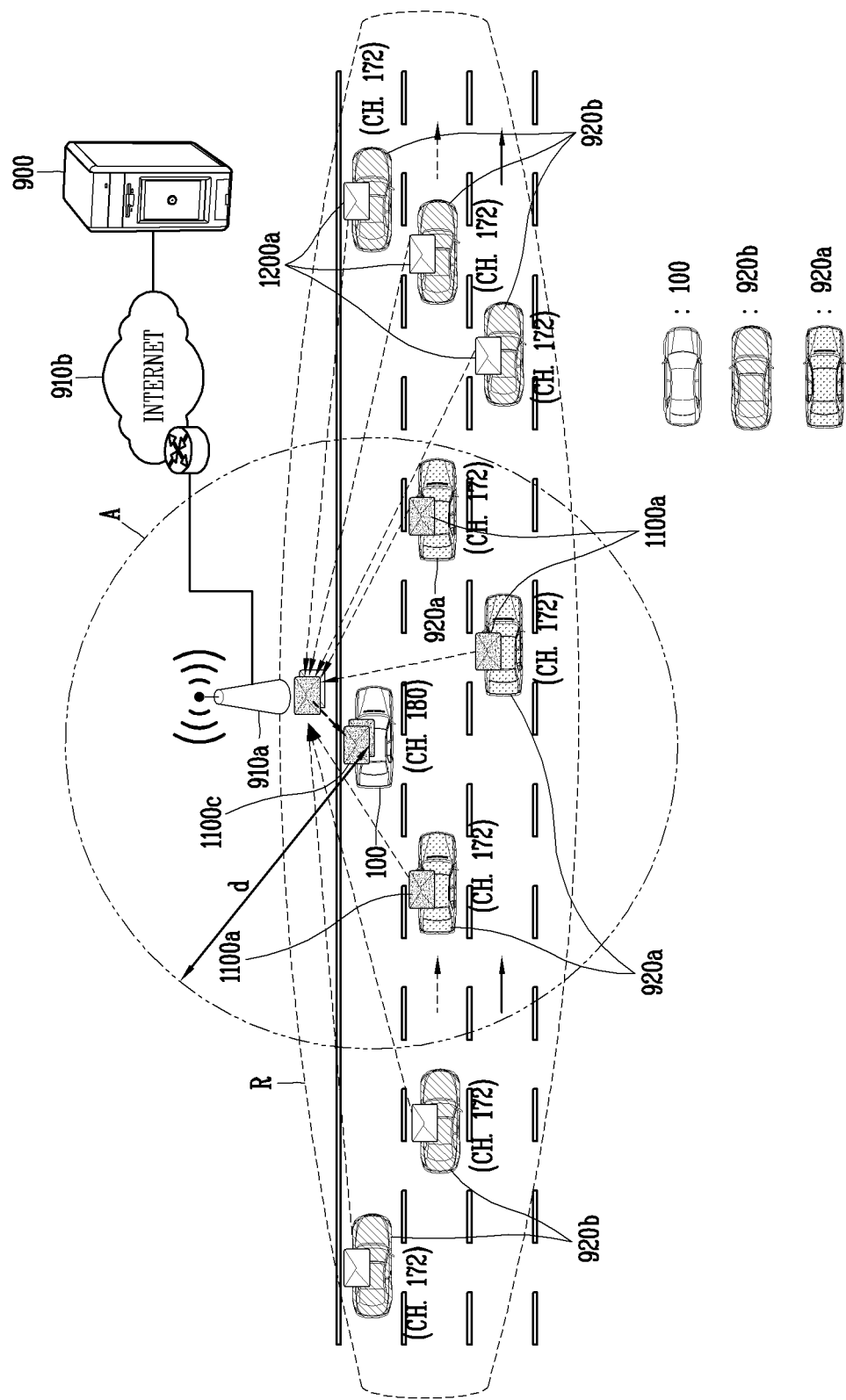

Referring to FIG. 12, the request message for requesting the safety-related message may include information for requesting a second message related to the safety of a third-party vehicle present within a certain distance from the host vehicle 100.

Referring to FIG. 12, the external server 900 may receive at least one safety-related message from at least one vehicle 100, 920, or 920b present in the predetermined region R. When information for requesting the second message 1100a related to the safety of the third-party vehicle 920a present within a certain distance d form the host vehicle 100 is included in the request message, the external server 900 may determine (extract or detect) the safety-related message 1100a received from the third-party vehicle 920a, which is one of the received safety-related messages 1100a and 1100b.

For example, the request message may include location information of the host vehicle 100, and the safety-related message may include location information of the vehicle that has transmitted the message.

The external server 900 may determine (extract or detect) the second message related to the safety of the third-party vehicle 920a present within a certain distance d from the host vehicle (or in a reference region A or a region of interest) on the basis of the location information included in the request message and the location information related to the safety-related message.

Subsequently, the external server 900 may transmit the determined second message 1100c through the channel through which the request message has been received from the host vehicle 100 (the second channel).

The second message 1100c may be the above-determined second message 1100b or the message processed according to the predetermined algorithm.

That is, when the request message 1000 includes information for requesting the second message 1100a related to the safety of the third-party vehicle 920a present within a certain distance from the host vehicle 100, the vehicle control device 170 of the host vehicle 100 may receive the second message from the external server 900 (or the infrastructure (RSU) 910a) through the currently set second channel.

The certain distance d (or the size of the reference region A (or the region of interest)) may vary depending on a driving state (e.g., speed) of the host vehicle 100 or traffic conditions (e.g., a traffic density on a road) and may be determined or changed according to user settings.

Through such a configuration, the present disclosure can provide a communication method capable of receiving the safety-related message through the currently set service channel according to various conditions as well as the vehicle in which the predetermined event has occurred while the service channel rather than the safety channel is set.

As described above, the communication device 400 of the host vehicle may communicate with the external server 900 through an RSU 910a installed on a road Also, the external server 900 may receive the safety-related message from at least one vehicle present in the predetermined region R via the RSU 910a. In this case, the safety-related message may be received through the first channel (the safety channel, e.g., Ch. 172) or may be received through the second channel (the service channel, e.g., Ch. 180) in the case of a vehicle to which the vehicle control method is applied.

The vehicle control device 170 of the host vehicle 100 may receive the safety-related messages from the external server 900 via the RSU 910a through the currently set channel (through the safety channel or through the service channel).

In this case, the vehicle control device 170 of the host vehicle 100 may transmit a request message for requesting the safety-related message through the currently set channel (e.g., the second channel) on the basis of a predetermined condition being satisfied.

Various conditions to be received may be set for the request message. As an example, the request message may include information for requesting a message related to the safety of the vehicle in which the predetermined event has occurred, information for requesting a message related to the safety of a third-party vehicle present within a certain distance from the host vehicle, or the like.

The vehicle control device 170 may receive the safety-related message corresponding to the request message from the external server 900 through the currently set channel.

The operations, functions, and controls performed by the external server 900 may be performed by the infrastructure (RSU) 910a. That is, the aforementioned operations of the external server 900 may be performed independently by the infrastructure (RSU).

In this case, the communication device 400 of the host vehicle 100 may receive the safety-related message as well as the message provided through the service channel by means of communication with the infrastructure (RSU).

Figure 13:
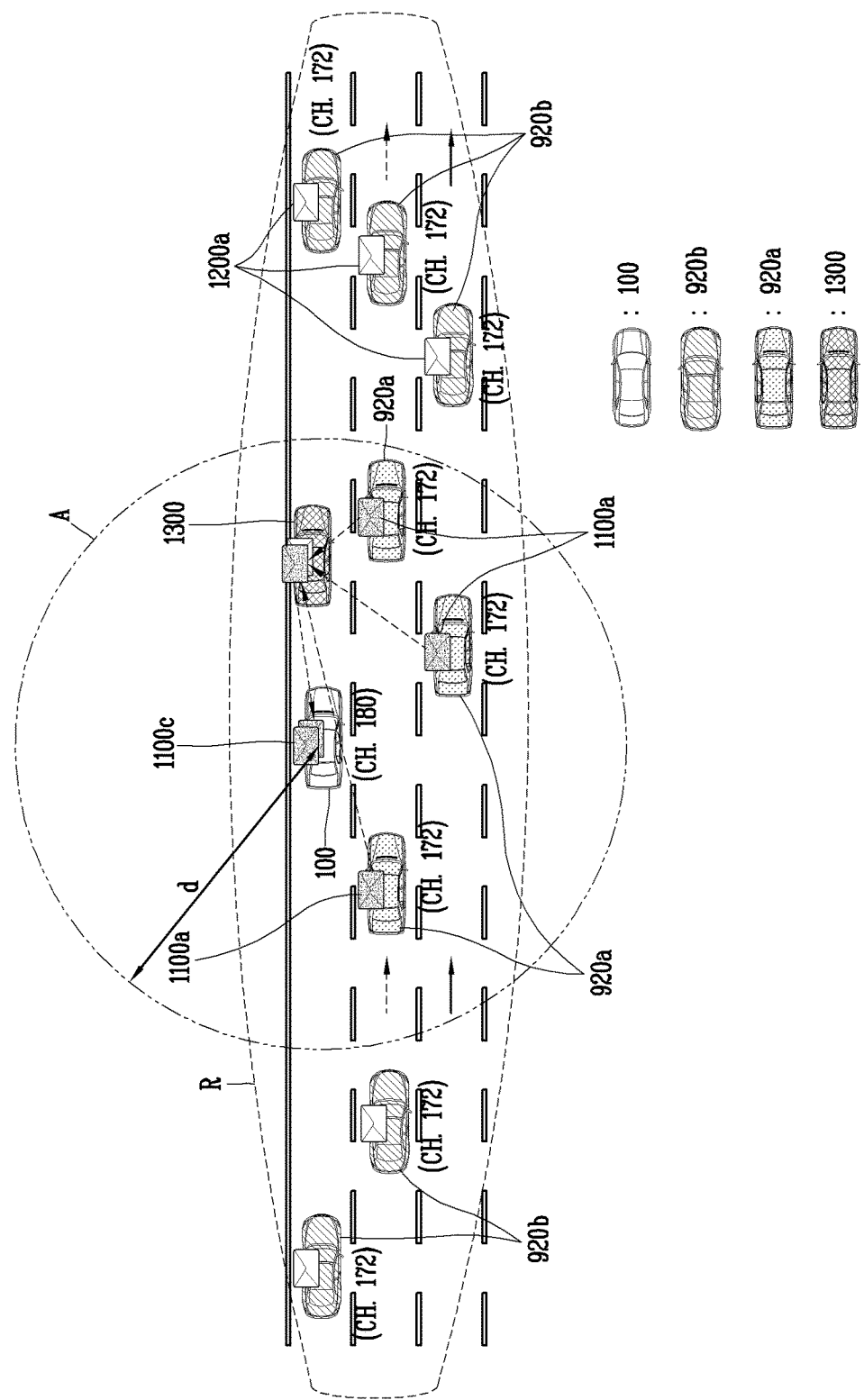

Meanwhile, referring to FIG. 13, a third-party vehicle 1300 capable of performing communication through a plurality of channels at one time point may be present near (within a communication distance from) the host vehicle 100. The third-party vehicle 1300 may have a communication device having two or more radio chips and may transmit or receive messages through the plurality of channels at one time point.

For example, the vehicle control device 170 may search for the third-party vehicle 1300 when information for allowing communication to be performed through the plurality of channel at one time point is received from the third-party vehicle 1300 or on the basis of a request or response by means of V2V communication.

In this case, as shown in FIG. 13, when the third-party vehicle 1300 capable of performing communication through the plurality of channels at one time point is found, the vehicle control device 170 may control the communication device to receive the safety-related message from the third-party vehicle 1300.

In this case, the third-party vehicle 1300 may perform the aforementioned operations, functions, controls, and roles of the external server.

For example, the third-party vehicle 1300 may receive the safety-related messages from a nearby vehicle through a first channel among the plurality of channels while transmitting and receiving the service message to and from the host vehicle 100 through second channel. This operation may be performed with no channel change while the first channel and the second channel are activated.

In this case, the vehicle control device 170 of the host vehicle 100 may transmit a request message for requesting the safety-related message to the third-party vehicle 1300 through the second channel while the second channel (the service channel) is set.

In this case, the third-party vehicle 1300 may transmit the safety-related message corresponding to the request message to the host vehicle 100 through the currently set channel (the second channel) on the basis of the request message.

That is, while the second channel (the third-party vehicle) is set, the vehicle control device 170 of the host vehicle 100 may transmit a request message for requesting the safety-related message to the third-party vehicle 1300 through the second channel and may receive the safety-related message corresponding to the request message from the third-party vehicle.

In this case, as described above, when the request message includes information for requesting a first message related to the safety of the vehicle in which the predetermined event has occurred, the third-party vehicle 1300 may transmit a message corresponding to the first message to the host vehicle 100.

Also, when the request message includes the information for requesting the second message 1100*a* related to the safety of the third-party vehicle 920*a* present within a certain distance d from the host vehicle 100, the third-party vehicle 1300 may extract a message 1100*c* corresponding to the second message 1100*a* and transmit the extracted message 1100*c* to the host vehicle 100.

Through such a configuration, the present disclosure can provide a control method capable of receiving the safety-related message even while the safety channel is not set by using a third-party vehicle capable of performing communication through a plurality of channels at one time point even when an RSU is not installed.

According to an implementation of the present disclosure, it is possible to achieve one or more of the following effects.

The present disclosure can provide a vehicle capable of receiving a plurality of services by overcoming the conventional imitation in which only one service is received through one channel at one time point.

Also, the present disclosure can provide a vehicle capable of receiving a safety-related message at any time a user wants by receiving the safety-related message through a channel other than a channel allocated to receive the safety-related message.

The present disclosure is not limited to the above effects, and other effects not described herein may be clearly understood by those skilled in the art from the accompanying claims.

Also, the above-described operations or control methods of the vehicle control device 170 may be applied to the operation or control method of the vehicle 100 in the same or similar way.

For example, the control method of the vehicle 100 (or the control method of the vehicle control device 170) may include communicating with an external server through any one of a plurality of channels and receiving a safety-related message from the external server.

Here, the receiving may include receiving the safety-related message from the external server through a channel other than a channel allocated to transmit and receive the safety-related message.

Also, all the above-described functions, configurations, or control methods performed by the vehicle control device 170 may be performed by the control unit 170 provided in the vehicle 100. That is, all the control methods described herein may be applied to a control method for a vehicle and a control method for a control device.

The foregoing present disclosure may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative. The scope of the disclosure should be determined by reasonable interpretation of the appended claims and all changes that come within the equivalent scope of the disclosure are included in the scope of the disclosure.

The invention claimed is:

1. A vehicle comprising:
 a communication device configured to communicate with an external server through a plurality of channels; and
 a vehicle control device configured to control the communication device to receive a safety-related message from the external server,
 wherein the plurality of channels includes a first channel that is allocated to transmit and receive the safety-related message,
 wherein the vehicle control device is configured to control the communication device to receive the safety-related message from the external server through a second channel that is different from the first channel,
 wherein the second channel is allocated to transmit and receive a service message,
 wherein the vehicle control device is configured to receive the safety-related message from the external server through the second channel rather than the first channel based on a predetermined condition being satisfied while the communication device is set to the second channel, and wherein the vehicle control device is configured to control the communication device to transmit a request message for requesting the safety-related message from the external server through the second channel based on the predetermined condition being satisfied while the communication device is set to the second channel.

2. The vehicle of claim 1, wherein:
the external server receives at least one safety-related message from one or more vehicles present in a predetermined region; and
the vehicle control device is configured to receive a safety-related message corresponding to the request message among safety-related messages received from the external server through the second channel.

3. The vehicle of claim 2, wherein:
the request message includes information for requesting a first message related to safety of one or more vehicles in which a predetermined event has occurred; and
based on the one or more vehicles in which the predetermined event has occurred being present in the predetermined region, the vehicle control device receives the first message from the external server through the second channel.

4. The vehicle of claim 3, wherein the predetermined event includes being in an accident, breaking down, or being an emergency vehicle.

5. The vehicle of claim 2, wherein based on the request message including information for requesting a second message related to safety of a third-party vehicle present within a certain distance from the vehicle, the vehicle control device receives the second message from the external server through the second channel.

6. The vehicle of claim 5, wherein the vehicle control device is configured, based on receiving the safety-related message from the third-party vehicle, to determine at least one of a relative location, a relative speed, or a relative angle of the third-party vehicle.

7. The vehicle of claim 6, wherein the vehicle control device is configured, based on receiving the safety-related message from the third-party vehicle, to perform an advanced driving assistance system (ADAS) function.

8. The vehicle of claim 1, wherein the communication device is configured to communicate with the external server via a road side unit (RSU) installed on a road.

9. The vehicle of claim 8, wherein:
the external server receives a safety-related message from one or more vehicles present in a predetermined region via the RSU; and
the vehicle control device is configured to receive a safety-related message from the external server via the RSU.

10. The vehicle of claim 1, wherein based on a third-party vehicle that performs communication through a plurality of channels at one time point being identified, the vehicle control device controls the communication device to receive the safety-related message from the third-party vehicle.

11. The vehicle of claim 1, wherein the communication device is a radio receiver.

12. The vehicle of claim 1, wherein the first channel is allocated to a first radio frequency, and the second channel is allocated to a second radio frequency that is different from the first radio frequency.

13. The vehicle of claim 1, wherein the predetermined condition includes a user request.

14. The vehicle of claim 1, wherein the predetermined condition includes a number of the safety-related messages transmitted to or received from the external server being higher than a reference value.

15. The vehicle of claim 1, wherein the safety-related message is formed according to a dedicated short-range communication (DSRC) communication standard.

16. A vehicle control method comprising:
communicating with an external server through any one of a plurality of channels; and
receiving a safety-related message from the external server,
wherein the receiving comprises receiving the safety-related message from the external server through a channel other than a channel allocated to transmit and receive the safety-related message,
wherein the plurality of channels includes a first channel that is allocated to transmit and receive the safety-related message, and
wherein the vehicle control method further comprises:
controlling a communication device to receive the safety-related message from the external server through a second channel that is different from the first channel, the second channel is allocated to transmit and receive a service message,
receiving the safety-related message from the external server through the second channel rather than the first channel based on a predetermined condition being satisfied while the communication device is set to the second channel, and
transmitting a request message for requesting the safety-related message from the external server through the second channel based on the predetermined condition being satisfied while the communication device is set to the second channel.

17. The control method of claim 16, further comprising receiving at the external server at least one safety-related message from a third-party vehicle present in a predetermined region.

18. The control method of claim 17, further comprising determining, based on receiving the safety-related message from the third-party vehicle, at least one of a relative location, a relative speed, or a relative angle of the third-party vehicle.

* * * * *